Patented Mar. 17, 1931

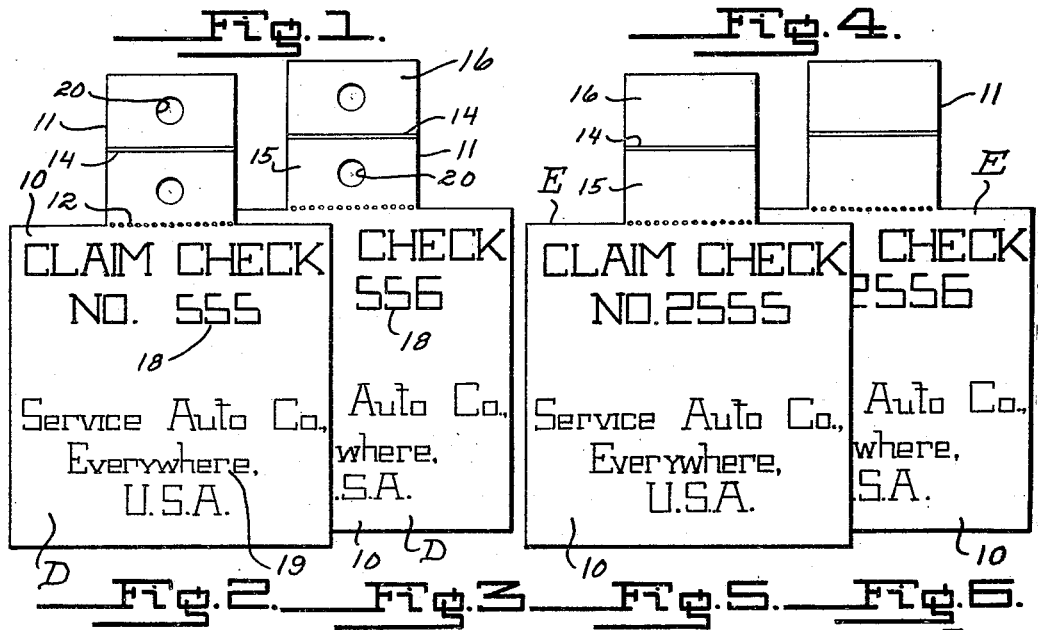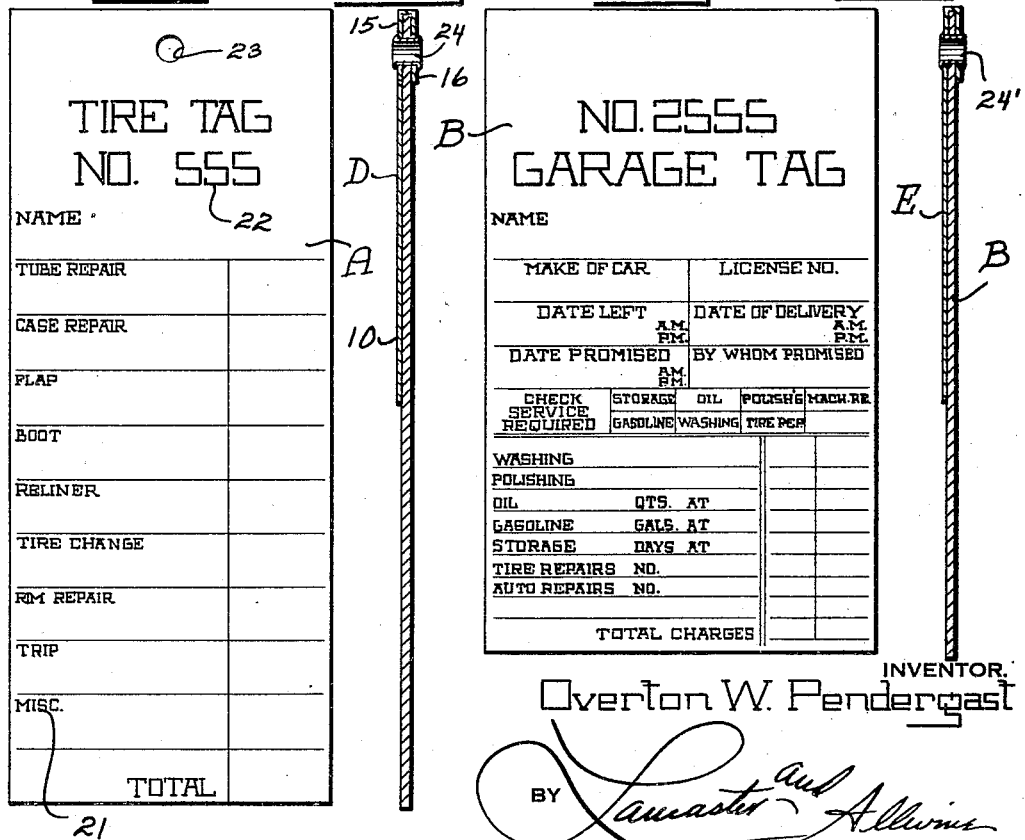

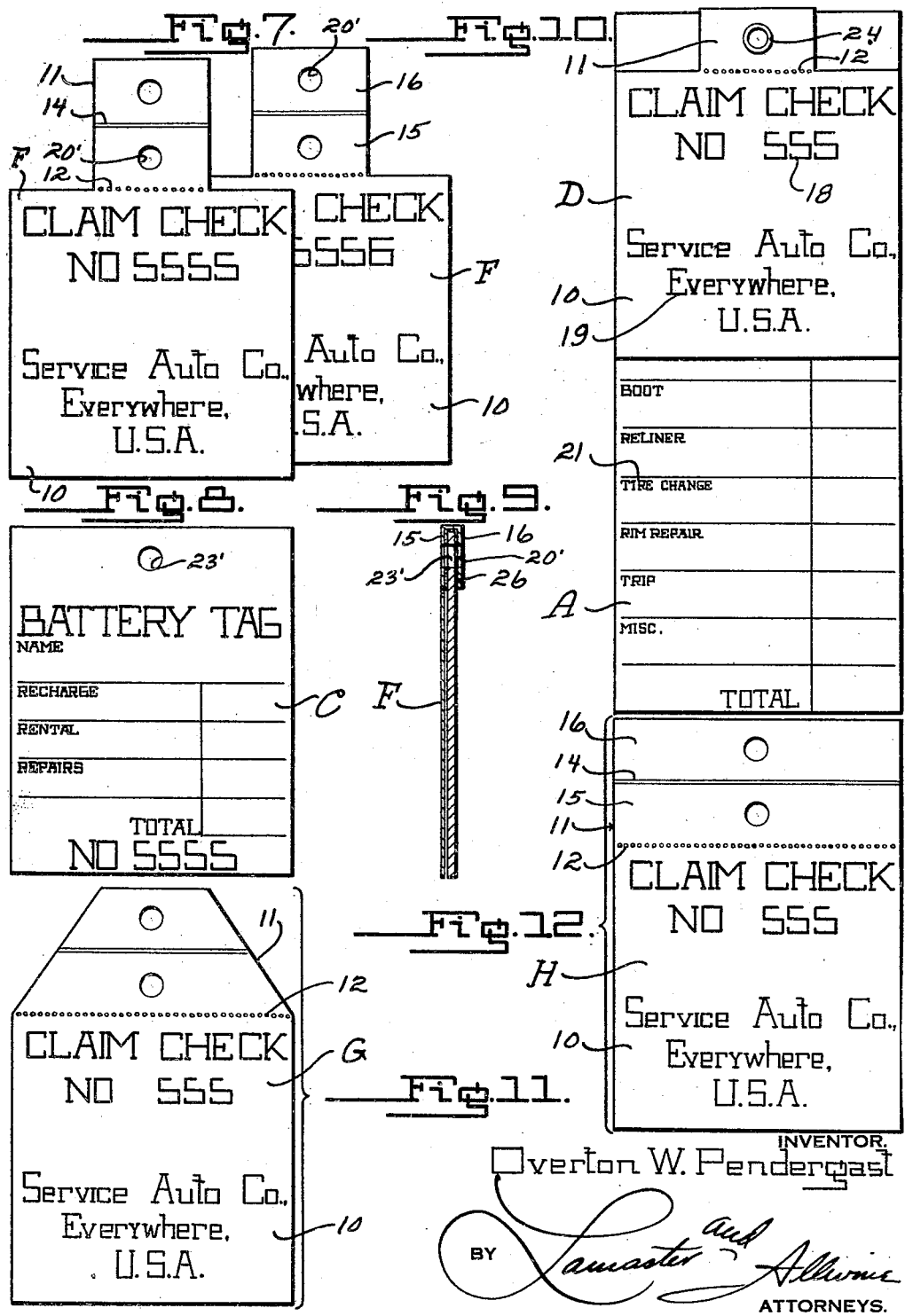

1,796,894

UNITED STATES PATENT OFFICE

OVERTON W. PENDERGAST, OF TERRE HAUTE, INDIANA

TAG-HOLE PATCH WITH DETACHABLE CLAIM CHECK

Application filed July 20, 1928. Serial No. 294,223.

The present invention relates to tags, and more particularly to service tags or tickets embodying identification portions.

Users of service tags, such as garages, repair shops and concerns handling various other classes of work, find it necessary to use several different types of service tickets or tags applicable to the particular class of work to which the tag is applied. These service tickets or tags vary greatly as to the quality of stock and size, and the copy or imprint appearing upon the differing sizes and types of tags varies widely in accordance with the intended use of the tag. The detachable claim check portions of such tags however, usually contain about the same copy, namely the name of the user and an identification number corresponding with an identification number printed on the main body portion of the tag. Such types of service tags are expensive and require a different "form lock up and press make ready" for each style of tag and require that the claim check portion be of an expensive stock such as required for making the main body portion of the tag.

It is therefore a primary object of the present invention to provide means whereby the claim check portion of the tag may be constructed from a cheaper quality of stock than that required for making the main body portion of the tag.

A further object of the invention is to provide a combined patch and claim check which may be applied to any size or type of service tag regardless of stock or intended use of the tag.

A further object of the invention is to provide an improved service tag including an identification portion and a tag main body portion, said identification portion being of such construction as to act as a reinforcing means for the tag hole.

A further object of the invention is to provide a claim check having a patch extension at one margin thereof for attachment to one edge of a tag body portion to serve as a reinforcement for the hole of the tag, and from which extension the check portion is readily severable.

Other objects and advantages of the invention will be apparent during the course of the following detailed description, taken in connection with the accompanying drawings forming a part of this specification and in which drawings:

Figure 1 is a plan view showing two of the combined patches and claim checks.

Figure 2 is a plan view of one style of service tag to which the combined patch and claim check may be attached.

Figure 3 is a central longitudinal section thru the tag shown in Figure 2 and showing the combined patch and check as applied thereto.

Figure 4 is a plan view showing two of a slightly modified form of the combined patch and claim check.

Figure 5 is a plan view of a different type of service tag from that shown in Figure 2.

Figure 6 is a central vertical section thru the tag shown in Figure 5 and showing one of the identification devices shown in Figure 4 applied thereto.

Figure 7 is a plan view showing two consecutively numbered identification devices similar to those illustrated in Figure 1, save for the identification numbers printed upon the check portions.

Figure 8 is a plan view of a third type of service tag.

Figure 9 is a view showing the form of identification devices illustrated in Figure 7 applied to the tag as shown in Figure 8.

Figure 10 is a plan view showing one of the devices illustrated in Figure 1 applied to the tag shown in Figure 2.

Figures 11 and 12 are plan views of slightly modified forms of identification devices.

Referring to the drawings in detail, and wherein similar reference characters designate corresponding parts thruout the several views, the letters A, B and C designate different styles and sizes of tag bodies, and D, E, F, G and H preferred and modified forms of identification devices susceptible of attachment to either type of tag body A, B or C.

With each form of identification device D, E, F, G and H it will be observed that the devices embody check portions 10 having each an extension 11 at one margin thereof forming a tag hole patch portion for attachment to the tag body. In each form of identification device the portions 10 and 11 are separable along a weakening line 12 in the form of a row of perforations aligning with the top edges of the check portions 10. Score lines 14 are provided at the medial fold line of each of the patch portions 11 and divide each patch portion into leaves 15 and 16.

Referring now to Figures 1, 2 and 3, and more specifically to the identification devices as illustrated in Figure 1, the check portion 10 has identification numbers printed thereon as at 18 and also bears the name of the user as at 19. The check portions are printed with consecutive numbers and these numbers are preferably of such size as to permit of the numbers being printed upon the checks by means of numbering machines. Each of the leaves 15 and 16 is perforated as at 20, and these perforations are intended to align axially when the patch portion 11 is folded along the medial lines 14. The tag body A has been shown to represent a tire tag, and has a suitable copy as at 21 printed upon the face side thereof together with an identification number 22 corresponding with an identification number appearing upon one of the consecutively numbered identification devices. The usual tag hole 23 is provided adjacent the upper margin of the tag body and this hole ordinarily serves to receive a tie string whereby the tag body may be applied to any desired article. The devices D are attached to the tag body A by folding the leaf 16 over the rear face of the leaf 15 and then aligning the apertures 20 with the tag hole 23. An eyelet 24 is then placed thru the aligning apertures 20 and hole 23 for securely attaching the patch to the tag body with the medial fold lines 14 engaging along the top edge of the tag body A and with the check portion 10 disposed in overlying relation upon the front surface of the tag body as clearly illustrated in Figure 10. By so having the medial fold or bight of the patch portion 11 contacting with the top edge of the tag body it will be seen that the check portion will be held against shifting to either side of the tag body thru rotation of the identification device about the attaching eyelet 24.

When the identification device is so attached to the tag body portion it will be observed that the extension 11 provides a tag hole reinforcement. With the identification device thus applied to the tag body, the claim check portion 10 may be readily severed from the reinforcing patch portion 11 along the perforated line 12 and presented to the claimant and the tag body applied to the article of work as in the usual manner of use of service tags having detachable claim check portions. Thus it will be seen that a device D when applied to the tag body A forms a combined patch reinforcement for the tag hole and a claim check which is readily detachable from the tag body without likelihood of mutilating any of the tag body. It will of course be understood that the claim check will bear an identification number corresponding to the identification number printed on the tag body to which the identification device is attached.

Referring now to Figures 4, 5 and 6, it will be observed that the identification devices E are in all respects similar to the identification devices D, except for the provision of the apertures 20 in the leaves of the patch portion 11. It will also be observed that the tag body B is not provided with a tag hole adjacent its upper margin. With this formation of service tag, the patch portion leaves 15 and 16 are folded along the medial fold lines 14 to embrace the upper edge of the tag body and attached to the tag body by means of an eyelet 24' inserted thru the superposed sections by the conventional type of eyeleting machine of that type wherein the hole is punched and the eyelet set with one operation. It may here be well to state that the identification devices as shown in Figures 1, 4, 7, 11 and 12 are applicable for attachment to any type of form or tag body regardless of its size, quality of stock, or type of copy appearing thereon adapting the tag body to different uses.

With the form of identification device and tag body as shown in Figures 7, 8 and 9, the leaves 15 and 16 of the patch portion 11 are provided with apertures 20' which align axially when the patch portion is folded along the score lines 14. The tag body C is provided with the tag hole 23' with which the apertures 20' align when the patch portion is folded over the upper edge of the tag body as shown in Figure 9. With this form of identification device, the rear surface of the patch portion 11 is coated thruout with a suitable adhesive as at 26 in Figure 9 for securing the leaves 15 and 16 to the front and rear surfaces of the tag body about the tag hole 23'. If so desired, the patch portion 11 may be first secured to the tag body by the adhesive 26 and then the hole punched thru the three layers of material for receiving the tie string.

With each form of identification device D, E and F it will be observed that the patch portions 11 are of a width substantially less than the full width of the check portions 10 and project from the upper edges of the check portions at the longitudinal center of the check portions.

In the form of identification device G shown in Figure 11, the end edges of the patch portion 11 converge toward the upper edge of the patch portion from a point at the side edges of the check portion 10.

In the form of identification device H, the patch portion 11 extends thruout the entire width of the identification device. With the forms of identification devices G and H a stronger joint is formed between the portions 10 and 11 by reason of the perforated separating line 12 extending thruout the entire width of the patch portion. With the relatively large patch portion 11 as shown in Figures 11 and 12, the leaves 15 and 16 provide relatively large areas upon which any desired copy may be printed if such is desirable.

As to the economy in production of the types of service tags as disclosed, the service ticket or tag manufacturer can print up and retain in stock groups of consecutively numbered tag bodies such as shown in Figures 2, 5 and 8, and each type of tag body can be completed with one "lock up and one press make ready". Since the check portions 10 of the identification devices are of like sizes and each bears the same copy or imprint except for the consecutive numbering of the checks, the printer can print the name and numbers upon the check portions at one time with one "lock up and one press make ready" with the aid of an automatic numbering machine. With the tag bodies having been previously printed and consecutively numbered, the manufacturer can deliver tags upon order much quicker, since it will only be necessary to print the claim checks with the desired copy and consecutively number the checks to conform with the tag bodies to which the checks are to be attached. The identification devices can be printed on much cheaper stock than required for the tag bodies and the manufacturer can print the identification devices in large groups for different customers and for use on practically all sizes and kinds of tag body portions. It will be seen that since the identification devices are applicable to practically all types of tag bodies, the printer can produce as one job, the printed claim checks for use upon several different standard tag body portions which have been previously printed up and consecutively numbered prior to receipt of an order for the completed tags.

From the foregoing description it will be apparent that a novel and improved type of service tag has been provided which will permit the claim check portion being formed of a cheaper quality of stock than the main tag body, and which service tag is of such nature as to permit of economical manufacture of the tags as to the printed copies required upon the tags. It will also be apparent that an improved identification device for tag bodies has been provided embodying a check portion and a patch portion for attachment to the tag body in a manner to serve as a reinforcement for the hole of the tag, and from which patch portion the check portion is readily severable and bears identification numbers corresponding with identification numbers appearing upon the tag body to which the identification device is attached.

Changes in detail may be made to the forms of invention herein shown and described, without departing from the spirit of the invention or the scope of the following claims:

I claim:

1. A service tag comprising a tag body portion, an identification device embodying a check portion and a patch portion folded upon itself to receive one marginal portion of the tag body therebetween at the tag hole portion of the tag body, and means on said tag for securing said identification device to said body portion and for receiving a connecting element extending from the article to be identified, said check portion being detachable from the patch portion along a weakened line extending across said identification device.

2. A service tag comprising a tag body, an identification device embodying a claim check portion and a patch portion folded upon itself to receive one marginal portion of the tag body therebetween, said check portion and tag body bearing like identification numbers, and means connecting the patch portion to the tag body and providing a tag hole opening for the service tag extending thru the tag body and folds of the patch portion.

3. A service tag comprising a tag body provided with a tag hole, an identification device embodying a check portion and a patch portion provided with apertures for aligning with the tag hole when the patch portion is folded upon itself to embrace the tag hole portion of the tag body, and an eyelet extending thru the aligning apertures and tag hole for securing the patch portion to the tag body about the tag hole thereof.

4. A service tag comprising a tag body having a tag hole provided adjacent its upper margin, an identification device embodying a check portion and a patch portion having apertures provided therein for aligning with the tag hole opening when the patch portion is folded upon itself to embrace the upper portion of the tag body, and an adhesive applied to the rear surface of the patch portion for securing the folded leaves of the patch portion to the front and rear faces of the tag body about the tag hole provided therein.

5. A service tag comprising a tag body, an identification device embodying a check portion having an extension at one margin thereof folded upon itself over one edge of the tag body with the fold in contact with said edge of the tag body, and an eyelet extending thru the said marginal extension of the identification device and the tag body for securing the identification device to the tag body and providing an opening for receiving a tie string for the tag.

6. A service tag comprising a tag body portion provided with a tag hole, and an identification device embodying a claim check portion and a patch portion folded upon itself to receive one marginal portion of the tag body portion therebetween, said patch portion having the sections at each side of the fold line thereof provided with aligning apertures spaced equally from the fold line of the patch portion as that of the tag hole from one edge of the tag body.

7. A service tag comprising a tag body, and an identification device embodying a claim check portion and a patch portion folded upon itself over the upper portion of the tag body and secured to opposite surfaces of the tag body, and an opening formed thru the overlying portions of the patch portion and adjacent portion of the tag body for receiving a tie string for the tag.

OVERTON W. PENDERGAST.